No. 786,792. PATENTED APR. 11, 1905.
M. ALTSTOCK.
POTATO DIGGER.
APPLICATION FILED JAN. 5, 1903.

Witnesses.
L. Waldman
E. Heymann.

Inventor.
Marcus Altstock
by B. Singer Att'y.

No. 786,792. Patented April 11, 1905.

UNITED STATES PATENT OFFICE.

MARCUS ALTSTOCK, OF LEMBERG, AUSTRIA-HUNGARY.

POTATO-DIGGER.

SPECIFICATION forming part of Letters Patent No. 786,792, dated April 11, 1905.

Application filed January 5, 1903. Serial No. 137,913.

*To all whom it may concern:*

Be it known that I, MARCUS ALTSTOCK, a subject of the Emperor of Austria-Hungary, residing at 12 Turnowska, Lemberg, Galicia, Austria-Hungary, have invented a new and useful Improvement in Potato-Diggers, of which the following is a specification.

This invention relates to a potato digging and lifting machine, in which the potatoes raised are not lifted with their own halms, as has hitherto been usual, but with the halms of the next row to be treated, the same being simultaneously plucked and thrown off onto the part of the ground from which the potatoes have been already lifted.

Another feature of the machine which forms the object of the present invention consists in a share formed of separate bars provided with points resembling plowshares, being provided in place of the knife-share hitherto employed, which improved share may be adjusted to correspond to the depth of the soil of the field. These bars may also be provided at their upper sides with wedge-shaped projections, the cutting edges of which are directed forward in order to obtain a sufficient disintegration of the earth in the case of heavy soils. The tines of the lifting-rake, which is formed like a grate and which lifts the dug-up potatoes and frees them from soil, are so formed that any damage to the potatoes is avoided. The movement is transmitted from the rear wheels in the ordinary manner by means of chain-gear.

The invention is shown in the accompanying drawings, in which—

Figure 1:
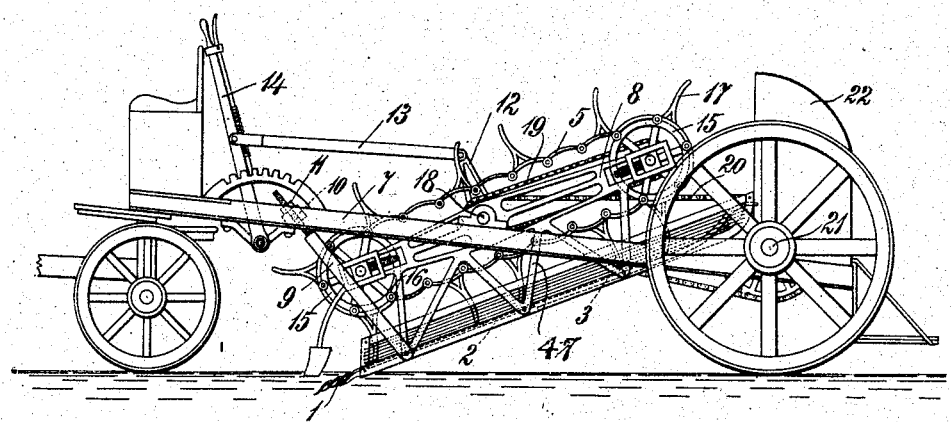
Figure 2:
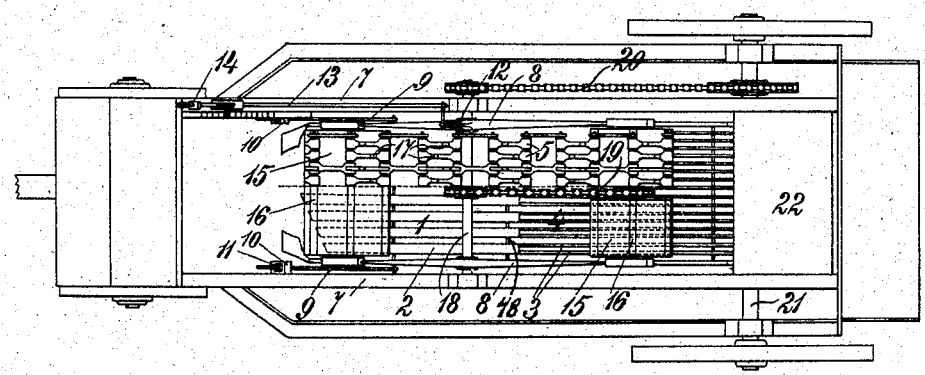

Figure 1 is a side view; Fig. 2, a plan view, partially in section, of a machine of this character.

The rake-share 1 consists of a number of pointed bars 2, resembling plowshares, which are extended at the rear end into two flattened projections 3, which form a grate 4, Fig. 2, over which the potatoes pass from the lifting-rake 5 into a suitable riddle. The bars 2 are secured to cross-pieces 48, which connect between the sides of the share 1 and are upturned at their rear end to discharge the material into the riddle. The rake-share 1 is carried, by means of braces 47, on an unequal armed balancer or pair of beams 8, mounted on the frame 7 of the digger. At the front end of the rake-share are screwed two bars 9, one at each side of the said share. The ends of these bars 9 are screw-threaded and pass through guides 10 in the frame 7 and carry tightening-nuts 11, by the tightening or slackening of which the rake-share can be exactly adjusted to the desired depth, Figs. 1 and 2. One of the beams 8 has an upwardly-directed projecting arm 12, from the upper end of which a connecting-rod 13 extends to the lever of the handle 14, which is provided in the ordinary way with a ratchet-lever and teeth, so that by the manipulation of this hand-lever 14 the rake-share may be raised or lowered to the desired depth.

The elevator or lifting-rake 5 is formed of a series of connecting-links, some of which are provided with projections or tines 17. These tines are preferably arranged to form a staggering row across the elevator.

The elevator is carried on drums 15, which are mounted on axles having bearings in the ends of the beam 8. These drums differ from those hitherto employed in being cylindrical instead of polygonal and in having their outer surfaces provided with grooves 16 parallel to the axis and adapted to engage with the hinge parts of the elevating-rake.

The lifting-rake is operated by means of chain-gear 19 on the shaft 18, which also carries the beam 8. Owing to the fact that the lifting-rake is mounted in the ends of the beam, it is raised and lowered simultaneously with the rake-share without its being necessary to disconnect the driving-gear. The transmission of power is effected from the rear wheels of the machine by means of a chain-gear 20 from the main driving-axle 21 to the shaft 18. The riddle is covered by a protecting-casing 22.

Having thus described my invention, what I claim, and desire to secure by Letters Patent, is—

In a potato-digger, the combination of beams 8 pivotally mounted on the main frame with the rearwardly-extending portion of said beams longer than the forwardly-extending portions, an upwardly-projecting arm 12 from one of said beams, a connecting-rod 13 pivoted to the end of said arm, a lever 14 at the forward end of said frame connected with said connecting-rod, and a pawl, and segment-rack for holding said lever in adjusted position whereby said beams may be adjusted, drums mounted in the end of said beams, an elevator provided with projecting tines coacting with said drums and driven thereby, a rake-share secured to said beams and along which said tines operate, and means for driving said drums, substantially as herein described.

In witness whereof I have hereunto signed my name, this 18th day of December, 1902, in the presence of two subscribing witnesses.

MARCUS ALTSTOCK.

Witnesses:
A. KNÖPFELMACHER,
ALVESTO S. HOGUE.